(12) United States Patent
Leung

(10) Patent No.: US 7,897,659 B2
(45) Date of Patent: Mar. 1, 2011

(54) WATER-BASED MOLDABLE MODELING DOUGH AND METHOD PREPARING THEREFOR

(75) Inventor: Chung Wai Leung, Guangdong Province (CN)

(73) Assignee: Huizhou Seasoar Art Supplies Co., Ltd., Guangdong Province (CN)

( * ) Notice: Subject to any disclaimer, the term of this patent is extended or adjusted under 35 U.S.C. 154(b) by 92 days.

(21) Appl. No.: 12/358,248

(22) Filed: Jan. 23, 2009

(65) Prior Publication Data

US 2010/0190887 A1    Jul. 29, 2010

(51) Int. Cl.
    *C08J 9/32*    (2006.01)

(52) U.S. Cl. .......................... 523/218; 523/219; 523/223
(58) Field of Classification Search .................. 523/218, 523/219, 223
    See application file for complete search history.

(56) References Cited

U.S. PATENT DOCUMENTS

| | | | | |
|---|---|---|---|---|
| 5,498,645 | A | * | 3/1996 | Mariano et al. ............... 523/218 |
| 5,578,119 | A | * | 11/1996 | Short et al. ............... 106/287.35 |
| 6,444,728 | B1 | * | 9/2002 | Yuyama ........................ 523/218 |
| 6,767,938 | B1 | * | 7/2004 | Cordova ........................ 524/28 |

* cited by examiner

*Primary Examiner* — Edward J Cain

(57) ABSTRACT

A water-based moldable modeling dough includes polyvinyl alcohol (PVA), vinyl acetate resin, water, maltose, maltitol, and hollow microspheres each with a diameter about 5-100 μm.

14 Claims, No Drawings

WATER-BASED MOLDABLE MODELING DOUGH AND METHOD PREPARING THEREFOR

BACKGROUND OF THE INVENTION

The present disclosure relates to moldable modeling dough, and particularly to water-based moldable modeling dough and a method preparing for the moldable modeling dough.

Generally, there are lots of modeling dough or clay for hand crafting, such as oil-based dough, the dough with filler starch, and the latter lightweight clay with polyvinyl alcohol dough.

The defect of the oil-based dough is non-air-dryable, which is not suitable for some application, for instance, to keep the resulted sculptures well and durable.

The air-dryable with starch-based modeling dough is well-know in the art, such as compositions disclosed by McVicker et al., in U.S. Pat. No. 3,167,440. However, this dough has a tendency to flake, crack, and crumble in both the wet and dry stage, moreover, this dough shrinks substantially upon drying and also the heavy weight character of this dough limits the users in the types of shapes that can be created without the dough falling apart.

Therefore, a desire for lightweight water-based dough was raised. U.S. Pat. No. 5,364,892 introduced that the hollow microsphere can realize the light weight dough. The resulting dough has the improved properties of durable, elastic, small tendency to crack and smaller volume shrinkage upon drying etc. However, the invention employed the gellant, borax, or some other boron containing chemicals, and this chemical may be acutely toxic if ingested, hence it may not suitable for children.

To get dough without boron containing gellant, U.S. Pat. No. 6,444,728 used the polyethylene oxide (PEO) to improve the plasticity and ductility when it was molded, and also to reduce the stickiness of dough to the hands of users. The dough was non-sticky, excellent in ductility, surface smoothness, shape preservation, hand feeling, and workability. However, the PEO is costly.

BRIEF SUMMARY OF THE INVENTION

An exemplary water-based moldable modeling dough includes polyvinyl alcohol (PVA), vinyl acetate resin, water, maltose, maltitol, and hollow microspheres each with a diameter about 5-100 μm.

DETAILED DESCRIPTION OF THE INVENTION

An exemplary embodiment of a water-based moldable modeling dough includes polyvinyl alcohol (PVA), vinyl acetate resin, water, maltose, maltitol, and hollow microspheres each with diameter about 5-100 μm.

In one embodiment, the PVA can be partially hydrolyzed polyvinyl acetate. The PVA is configured for bonding the filler of the dough together, in order to give the shape of the sculpture. The thermal stability and stretching ability of the PVA increase in response to the molecular weight of the PVA increasing. However, too high molecular weight would lead to the difficulties in modeling as the molding ability of dough decreases, therefore, the molecular weight of the PVA is determined according to fact conditions. The PVA should be first prepared in its paste form, such as about 20%-25% paste in weight by heating the corresponding amount of PVA in water, such as 3:1-4:1 in weight, in the temperature of about 85-95° C. for about half an hour.

In one embodiment, the vinyl acetate resin may be ethylene-vinyl acetate copolymer (EVA), polyvinyl acetate, or modified polyvinyl acetate. The function of the vinyl acetate resin is similar to that of the PVA which binds the filler of the dough together. In one embodiment, an emulsion of vinyl acetate resin is used. The molecular weight of the vinyl acetate resin is chosen about 1,000,000 to 1,500,000.

The water-based moldable modeling dough can further include humectant, not limited to sorbitol, propylene glycol, or glycerin, in the weight of 3-6%, to reduce the stickiness feeling of the dough and make the dough become moister when handling.

The hollow microsphere can be a synthetic thermal-expanding sphere with acrylonitrile and vinylidene chloride copolymer as the encapsulating wall and the low-boiling gas, isobutene, as the blowing agent inside the capsule. The function of the hollow microsphere is to fill up most of the volume of the resulted dough, greatly reducing the volume of shrinkage upon drying. Therefore, the hollow microsphere can reduce the tendency of cracking of the resulted dough. The particle size of the hollow microsphere employed in this disclosure is about 5-100 μm in diameter.

Although in this disclosure, no cross-linking gellant agent, such as borax is used to provide the matrix structure of cross-linked PVA polymer, similar effect, but of course not strong as boron-containing compound can still be realize by he maltose and maltitol. Maltose is a disaccharide formed from two units of glucose joined with an α(1→4) linkage. Maltitol is a sugar alcohol which is also known as 4-O-α-glucopyranosyl-D-sorbitol. The function of these two materials in this disclosure is to produce a great effect in increasing of the viscosity, making the dough feasible to stretch and shape without sticking to the hand as the paste does.

Also, other additive, such as preservatives, fragrance material, embittering agent or/and colorants may be added to the formulation to enhance the function and the quality of the resulted dough.

A general formulation of this disclosure is shown as follows:

TABLE 1

| Ingredient | Percent by Weight |
| --- | --- |
| Maltose | 10-20% |
| Maltitol | 5-10% |
| Polyvinyl alcohol (PVA) | 10-15% |
| Water | 45-50% |
| Vinyl acetate resin | 3-10% |
| Hollow microsphere | 4-6% |
| Humectant | 3-6% |
| Other additives | 1-5% |

Remarks:
Water:PVA = 4:1-3:1.

A first exemplary embodiment of a method for preparing water-based moldable modeling dough includes the following steps.

S1: PVA is added to water according to ingredient percent by weight of water:PVA=4:1-3:1, the mixture is heated up with stirring to 85-95° C. for half an hour until a clear transparent paste of PVA is formed, such as 13 g of PVA is added to the 51 g of water.

S2: 5 g of ethylene-vinyl acetate copolymer (EVA) emulsion, 15 g of maltose, and 6 g of maltitol are added into the paste mentioned above, stirring completely.

S3: 5 g of humectant such as sorbitol and 1 g of other additive such as preservative, embittering agent and fragrance agent are added into the paste to obtain a mixture.

S4: 5 g of synthetic resin hollow microspheres are added to the mixture mentioned above and mixed thoroughly.

Finally, a lightweight and high quality of dough is obtained. The dough is not sticky and easy to manipulate.

In a second embodiment, 20 g of maltose and log maltitol are added into the paste to replace the 15 g of maltose and 6 g of maltitol of S2. Finally, a clay which is not stick to hand, easy to form sculpture is obtained, and the observation shows us that if the maltose and maltitol contents increase, the clay becomes harder and the stick force between clay increases.

In a third embodiment, 10 g of maltose and 5 g maltitol are added into the paste to replace the 15 g of maltose and 6 g of maltitol of S2. Finally, a clay which is slightly stick to hand, easy to form sculpture is obtained, and the observation shows us that if the maltose and maltitol contents decrease, the clay becomes softer and the stickiness of clay towards hand increases.

The dough of this disclosure is non-sticky, excellent in ductility, surface smoothness, shape preservation, hand feeling, safe, costly, material easy to obtain, and workability.

It is believed that the present embodiments and their advantages will be understood from the foregoing description, and it will be apparent that various changes may be made thereto without departing from the spirit and scope of the disclosure or sacrificing all of its material advantages, the examples hereinbefore described merely being exemplary embodiments of the disclosure.

I claim:

1. A water-based moldable modeling dough comprising polyvinyl alcohol (PVA), vinyl acetate resin, water, maltose, maltitol, and hollow microspheres, wherein the hollow microspheres each has a diameter about 5-100 μm.

2. The water-based moldable modeling dough of claim 1, further comprising humectant.

3. The water-based moldable modeling dough of claim 2, wherein the humectant is glycerin, sorbitol, or propylene glycol.

4. The water-based moldable modeling dough of claim 2, further comprising other additive.

5. The water-based moldable modeling dough of claim 4, wherein the other additive is preservatives, fragrance material, embittering agent, or/and colorants.

6. The water-based moldable modeling dough of claim 4, wherein the ingredient percent by weight of the moldable modeling dough is about:

| Maltose | 10-20% |
| Maltitol | 5-10% |
| PVA | 10-15% |
| Water | 45-50% |
| Vinyl acetate resin | 3-10% |
| Hollow microsphere | 4-6% |
| Humectant | 3-6% |
| Other additives | 1-5%. |

7. The water-based moldable modeling dough of claim 2, wherein the vinyl acetate resin is ethylene-vinyl acetate copolymer, polyvinyl acetate, or modified polyvinyl acetate.

8. A method preparing for water-based moldable modeling dough, comprising:
    adding polyvinyl alcohol (PVA) into water at a weight ratio of water to PVA being about 4:1 to about 3:1, and heating up the mixture of the PVA and water with stirring to about 85-95° C. for about half an hour until a clear transparent paste of PVA is formed;
    adding vinyl acetate resin, maltose, and maltitol into the paste, and stirring completely; and
    adding hollow microsphere into the mixture of PVA, water, vinyl acetate resin, maltose, and maltitol, and mixing thoroughly.

9. The method of claim 8, after adding vinyl acetate resin, maltose, and maltitol into the paste, and stirring completely, comprising:
    adding humectant into the paste.

10. The method of claim 9, wherein the humectant is glycerin, sorbitol, or propylene glycol.

11. The method of claim 9, after adding vinyl acetate resin, maltose, and maltitol into the paste, and stirring completely, comprising:
    adding other additive into the paste.

12. The method of claim 11, wherein the other additive is preservatives, embittering agent, fragrance material, or/and colorants.

13. The method of claim 11, wherein the ingredient percent by weight of the maltose, maltitol, PVA, water, vinyl acetate resin, hollow microsphere, humectant, and other additives is about:

| Maltose | 10-20% |
| Maltitol | 5-10% |
| PVA | 10-15% |
| Water | 45-50% |
| Vinyl acetate resin | 3-10% |
| Hollow microsphere | 4-6% |
| Humectant | 3-6% |
| Other additives | 1-5%. |

14. The method of claim 13, wherein the PVA is 13 g, the vinyl acetate resin is 5 g, the humectant is 5 g, the other additive is 1 g, the maltose is 20 g or 10 g, and the maltitol is 10 g or 5 g, in response to the water being 51 g.

* * * * *